(12) United States Patent
Bonnet

(10) Patent No.: US 8,047,784 B2
(45) Date of Patent: Nov. 1, 2011

(54) LIFT DEVICE FOR ROTOR BLADE IN WIND TURBINE

(75) Inventor: Laurent Bonnet, Mesum (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/053,532

(22) Filed: Mar. 22, 2011

(65) Prior Publication Data

US 2011/0211954 A1    Sep. 1, 2011

(51) Int. Cl.
*F03D 7/04* (2006.01)
(52) U.S. Cl. .......... 416/1; 416/62; 416/235; 416/236 R
(58) Field of Classification Search ........... 416/1, 62, 416/235 R, 236 R, 238; 415/119, 4.3, 4.5; 290/44, 55
See application file for complete search history.

(56) References Cited

U.S. PATENT DOCUMENTS

| 1,446,011 | A | * | 2/1923 | Jackson | 416/236 R |
| 2,616,509 | A | * | 11/1952 | Thomas | 416/84 |
| 7,604,461 | B2 | | 10/2009 | Bonnet | |
| 2008/0166235 | A1 | | 7/2008 | Standish et al. | |
| 2009/0016891 | A1 | * | 1/2009 | Parsania et al. | 416/223 R |

* cited by examiner

*Primary Examiner* — Nathaniel Wiehe
*Assistant Examiner* — Aaron R Eastman
(74) *Attorney, Agent, or Firm* — Dority & Manning, P.A.

(57) ABSTRACT

A lift device for a rotor blade and a method for increasing the lift of a rotor blade for a wind turbine are disclosed. The rotor blade has exterior surfaces defining a pressure side and a suction side extending between a leading edge and a trailing edge. The lift device includes a first aerodynamic surface configured for mounting to the pressure side of the rotor blade, and a second opposing aerodynamic surface configured to interact with wind flowing past the lift device. The lift device has a generally increasing cross-sectional area in a flow direction of the wind. The lift device is configured to increase the lift of the rotor blade.

18 Claims, 4 Drawing Sheets

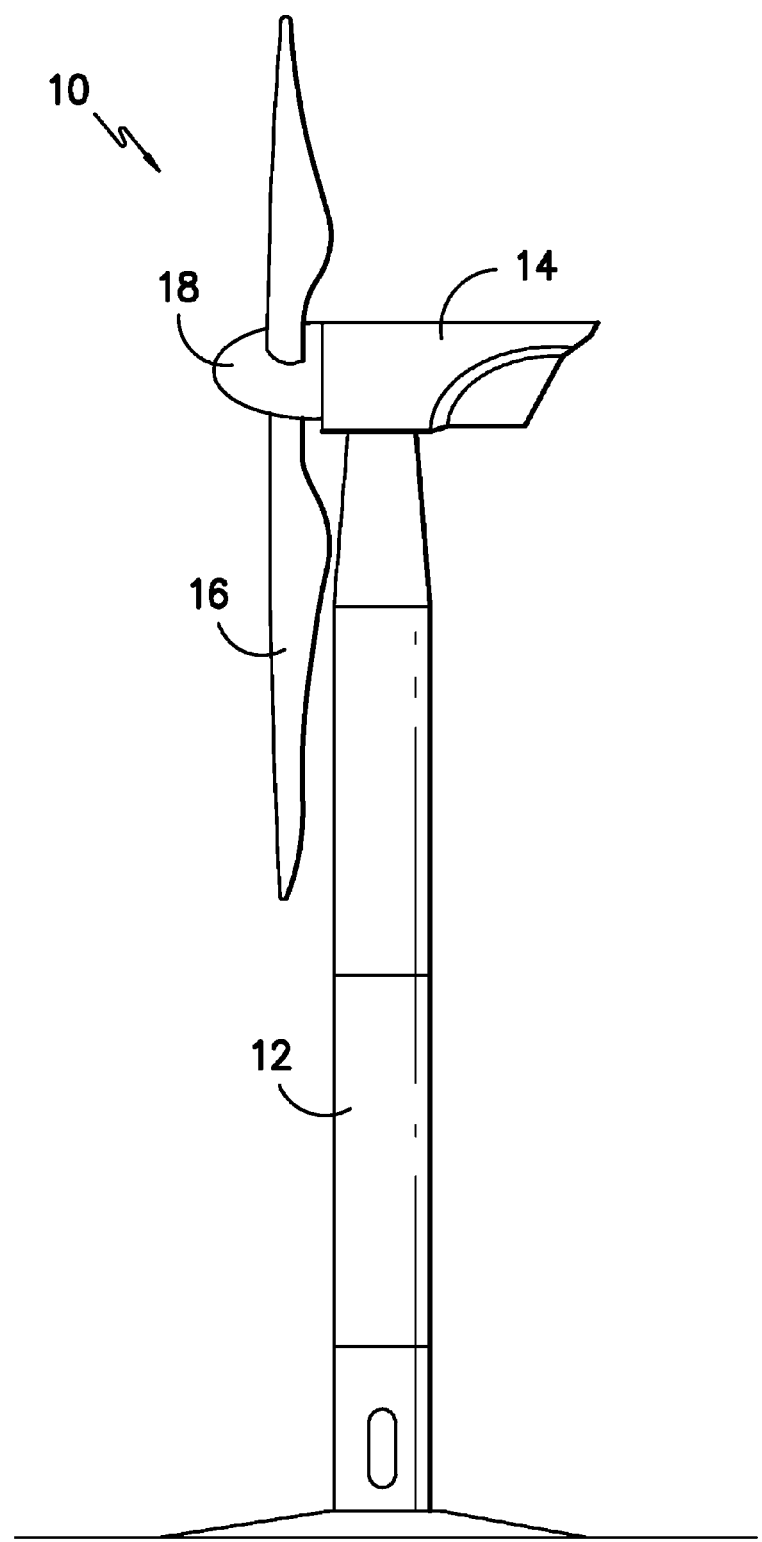
FIG. -1-

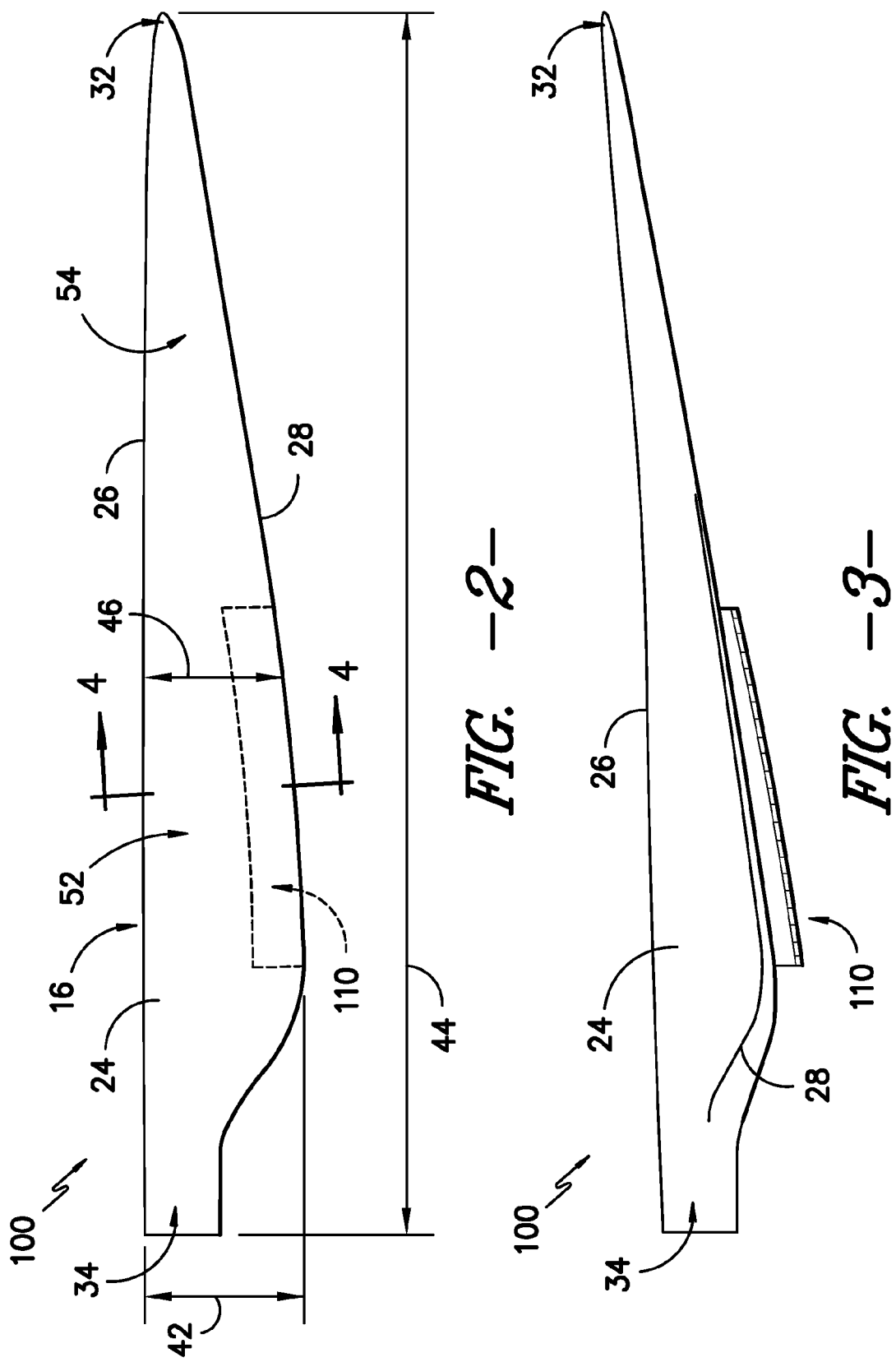

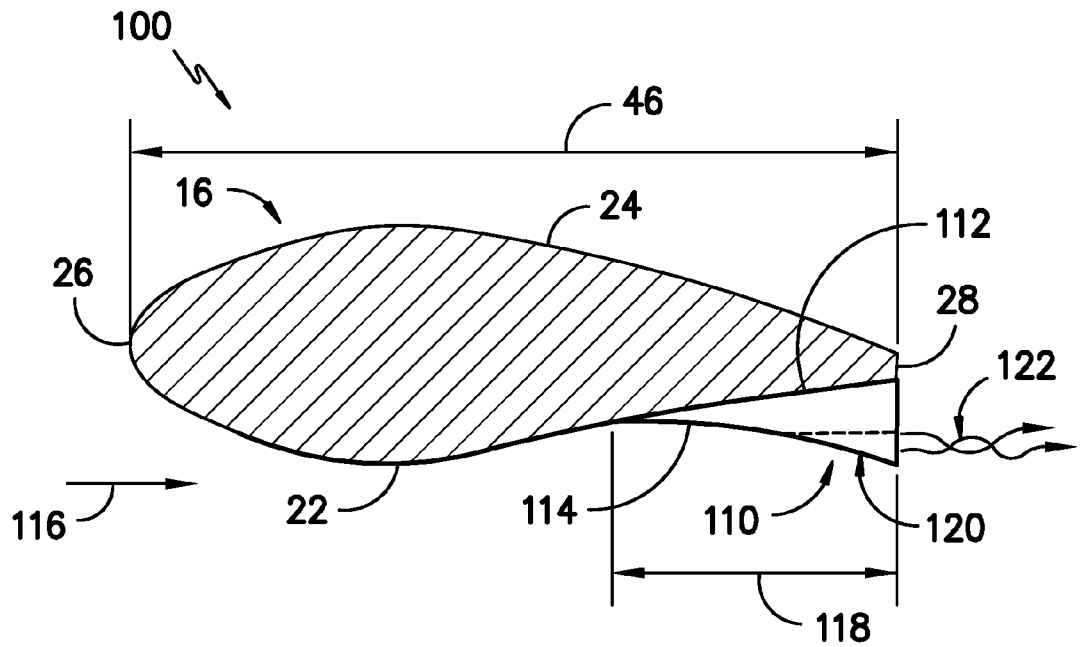
FIG. -4-
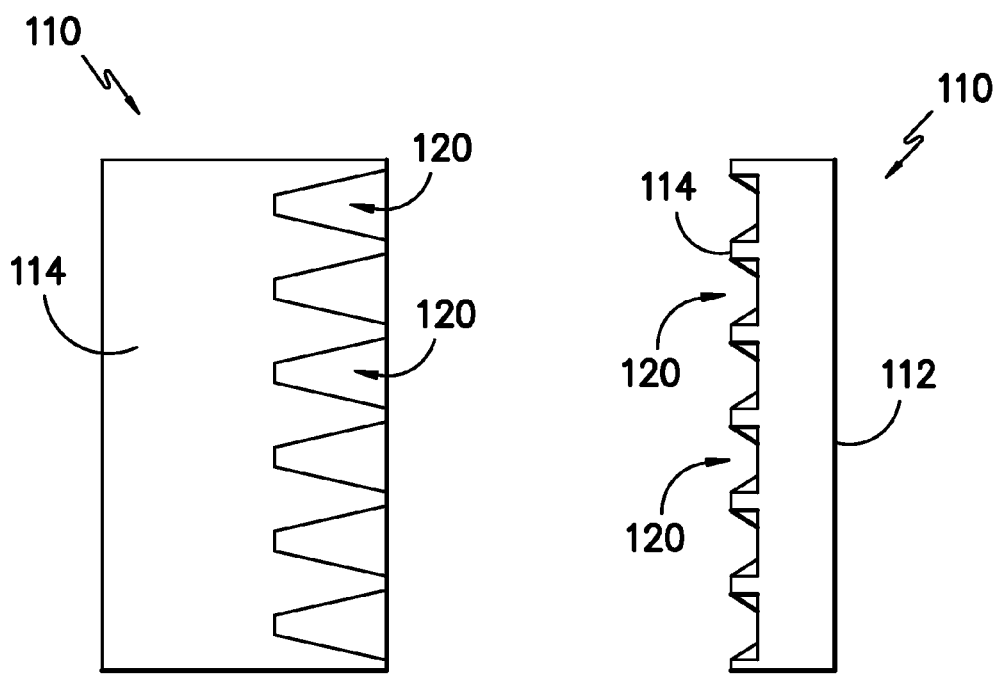
FIG. -5-   FIG. -6-

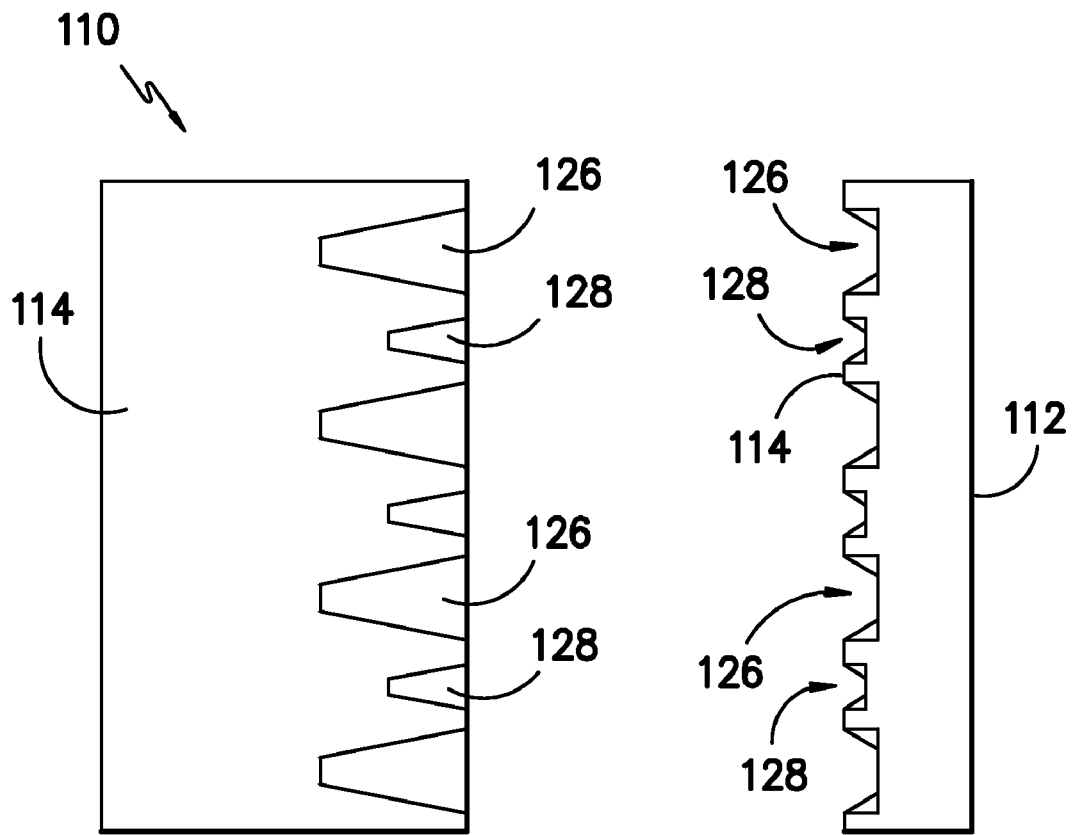
FIG. -7-   FIG. -8-
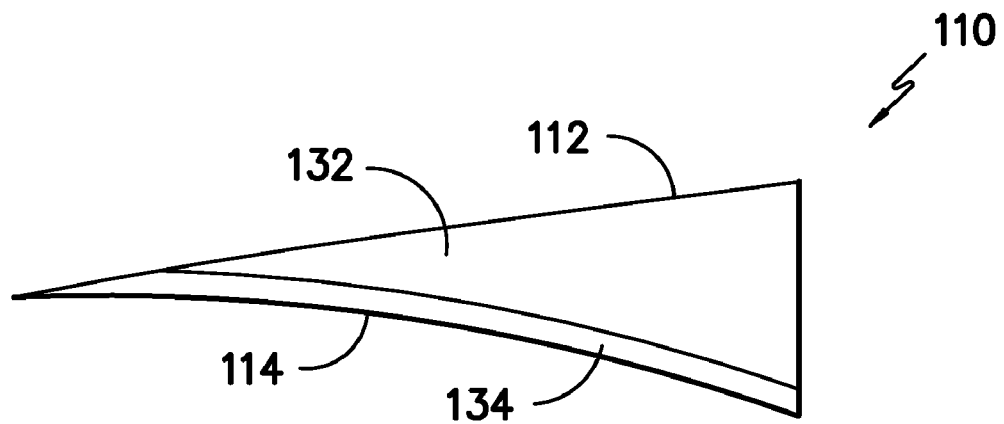
FIG. -9-

LIFT DEVICE FOR ROTOR BLADE IN WIND TURBINE

FIELD OF THE INVENTION

The present disclosure relates in general to wind turbine rotor blades, and more particularly to lift devices configured on the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

As rotor blades and wind turbines in general become capable of capturing increased kinetic energy, the acoustic noise associated with operation of the wind turbine may similarly increase. Thus, in many cases, known wind turbines and rotor blades may require that the amount of kinetic energy captured be compromised in order to prevent excessive associated noise. Further, known wind turbines and rotor blades are designed for a maximum lift and associated noise at only one operating point. Thus, these wind turbines and rotor blades cannot be accurately adjusted to multiple operating points and/or extended ranges with increased lift while the associated noise is maintained or reduced.

Thus, an improved rotor blade assembly and a lift device for a rotor blade assembly would be advantageous. For example, a rotor blade assembly and a lift device that do not require lift parameters to be compromised to prevent excessive noise would be desired. Further, a rotor blade assembly and a lift device that allow for increased lift and reduced associated noise would be desired.

BRIEF DESCRIPTION OF THE INVENTION

Aspects and advantages of the invention will be set forth in part in the following description, or may be obvious from the description, or may be learned through practice of the invention.

In one embodiment, a lift device for a rotor blade is disclosed. The rotor blade has exterior surfaces defining a pressure side and a suction side extending between a leading edge and a trailing edge. The lift device includes a first aerodynamic surface configured for mounting to the pressure side of the rotor blade, and a second opposing aerodynamic surface configured to interact with wind flowing past the lift device. The lift device has a generally increasing cross-sectional area in a flow direction of the wind. The lift device is configured to increase the lift of the rotor blade.

In another embodiment, a method for increasing the lift of a rotor blade for a wind turbine is disclosed. The method includes mounting a lift device to a pressure side of a rotor blade. The rotor blade has exterior surfaces defining the pressure side, a suction side, a leading edge, and a trailing edge extending between a tip and a root. The lift device includes a first aerodynamic surface mounted to the pressure side of the rotor blade and a second opposing aerodynamic surface configured to interact with wind flowing past the rotor blade assembly and having a generally increasing cross-sectional area in a flow direction of the wind. The method further includes rotating the rotor blade on the wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a wind turbine according to one embodiment of the present disclosure;

FIG. 2 is a top view of a rotor blade assembly according to one embodiment of the present disclosure;

FIG. 3 is a rear view of a rotor blade assembly according to one embodiment of the present disclosure;

FIG. 4 is a cross-sectional view, along the lines 4-4 of FIG. 2, of a rotor blade assembly according to one embodiment of the present disclosure;

FIG. 5 is a bottom view of a lift device according to one embodiment of the present disclosure;

FIG. 6 is a rear view of a lift device according to one embodiment of the present disclosure;

FIG. 7 is a bottom view of a lift device according to another embodiment of the present disclosure;

FIG. 8 is a rear view of a lift device according to another embodiment of the present disclosure; and, FIG. 9 is a side view of a lift device according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade 16 according to the present disclosure may include exterior surfaces defining a pressure side 22 and a suction side 24 (see FIGS. 3 through 5 and 7) extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIGS. 2 and 4, the chord 42 may vary throughout the span 44 of the rotor blade 16. Thus, as discussed below, a local chord 46 may be defined for the rotor blade 16 at any point on the rotor blade 16 along the span 44.

Additionally, the rotor blade 16 may define an inner board area 52 and an outer board area 54. The inner board area 52 may be a span-wise portion of the rotor blade 16 extending from the root 34. For example, the inner board area 52 may, in some embodiments, include approximately 33%, 40%, 50%, 60%, 67%, or any percentage or range of percentages therebetween, or any other suitable percentage or range of percentages, of the span 44 from the root 34. The outer board area 54 may be a span-wise portion of the rotor blade 16 extending from the tip 32, and may in some embodiments include the remaining portion of the rotor blade 16 between the inner board area 52 and the tip 32. Additionally or alternatively, the outer board area 54 may, in some embodiments, include approximately 33%, 40%, 50%, 60%, 67%, or any percentage or range of percentages therebetween, or any other suitable percentage or range of percentages, of the span 44 from the tip 32.

As illustrated in FIGS. 2 through 9, the present disclosure may further be directed to a rotor blade assembly 100. The rotor blade assembly 100 may include a lift device 110 and the rotor blade 16. In general, the lift device 110 may be mounted to an exterior surface of the rotor blade 16, and may increase the lift of the rotor blade 16 and rotor blade assembly 100. Further, as discussed below, the lift device 110 may include various features for reducing the noise associated with the rotor blade 16 and rotor blade assembly 100.

The lift device 110 may include a first aerodynamic surface 112 and a second opposing aerodynamic surface 114. The first aerodynamic surface 112 may be configured for mounting to an external surface of the rotor blade 16. Thus, the first aerodynamic surface 112 may have an aerodynamic contour similar to the contour of the external surface to which the first aerodynamic surface 112 is to be mounted, such that the first aerodynamic surface 112 generally fits together with the external surface.

In exemplary embodiments, the first aerodynamic surface 112 may be configured for mounting to, and mounted to, the pressure side 22. Alternatively, however, the first aerodynamic surface 112 may be configured for mounting to, and mounted to, any suitable exterior surface of the rotor blade 16.

Additionally, in some exemplary embodiments, as shown in FIG. 2, the first aerodynamic surface 112 may be configured for mounting, and may be mounted, within the inner board area 52 of the rotor blade 16. Alternatively, the first aerodynamic surface 112 may be configured for mounting, and may be mounted, within the outer board area 54 of the rotor blade 16, or at any other span-wise location on the rotor blade 16.

Further, in some exemplary embodiments, the first aerodynamic surface 112 may be configured for mounting, and be mounted, adjacent to the trailing edge 28 of the rotor blade 16. For example, in some embodiments, as shown in FIG. 4, the first aerodynamic surface 112 may be mounted adjacent to the trailing edge 28 such that the lift device 110 extends to the trailing edge 28 and does not extend past the trailing edge 28. In other embodiments, the first aerodynamic surface 112 may be mounted adjacent to the trailing edge 28 such that the lift device 110 does not extend to the trailing edge, or such that the lift device 110 extends past the trailing edge 28. Alternatively, the first aerodynamic surface 112 may be mounted adjacent to the leading edge 26, or may be mounted in any other suitable position adjacent to any exterior surface of the rotor blade 16.

The first aerodynamic surface 112 may be mounted using any suitable process or device. For example, the first aerodynamic surface 112 may be mounted using a suitable adhesive or mechanical fastener. Further, mounting of the first aerodynamic surface 112 should be understood to include integrally incorporating the lift device into a rotor blade 16 to form a rotor blade assembly 100.

As shown in FIG. 4, the second opposing aerodynamic surface 114 may be configured to interact with wind flowing past the rotor blade 16 and rotor blade assembly 100. For example, wind may generally flow past the rotor blade assembly 100 in a flow direction 116. The second opposing aerodynamic surface 114 may have a generally aerodynamic contour in order to interact with the wind. For example, the second aerodynamic surface 114 may have an aerodynamic contour such that, when the first aerodynamic surface 112 is mounted to the rotor blade 16, the second aerodynamic surface 114 extends from an exterior surface of the rotor blade 16. Thus, wind passing over the exterior surface may further interact with the second aerodynamic surface 114.

In exemplary embodiments, as shown in FIGS. 4 and 9, the lift device 110 may have a generally increasing cross-sectional area in the flow direction 116 of the wind. Thus, at one end, the first aerodynamic surface 112 and second aerodynamic surface 114 may have minimal spacing or thickness therebetween, while at the other end, the first aerodynamic surface 112 and second aerodynamic surface 114 may have maximal spacing or thickness therebetween. In exemplary embodiments, the cross-sectional area may taper oppositely of the flow direction 116 to an end having minimal or no spacing or thickness between the first aerodynamic surface 112 and second aerodynamic surface 114, such that when the first aerodynamic surface 112 is mounted to an exterior surface of the rotor blade 16, the exposed portion of the exterior surface and the second aerodynamic surface 114 may generally form a smooth, continuous exterior surface.

It should be understood that the cross-sectional area of the lift device 100 need not increase constantly in the flow direction 116. For example, only a portion, or various portions, of the cross-sectional area need increase, rather than the entire cross-sectional area.

Further, the increasing cross-sectional area of the lift device 110 may increase the total cross-sectional area of the rotor blade assembly 100 at the end of the lift device 110 having the greatest cross-sectional area. For example, the total cross-sectional area of the rotor blade assembly 100 at this end, which may, for example, be adjacent the trailing edge 28, may be increased by a factor in the range between a 1 to 2 increase and a 1 to 10 increase. In other words, the total thickness of the rotor blade assembly 100 at this end may increase by a factor in the range between a factor of 2 and a factor of 10, due to the addition of the lift device 110.

The lift device 110 according to the present disclosure may be configured to increase the lift of the rotor blade 16 and rotor blade assembly 100. For example, when the lift device 110 is mounted to the rotor blade 16, the lift produced by the rotor blade assembly 100 for a given wind flow may be increased. As discussed above, the second aerodynamic surface 114 may be configured to interact with wind flowing past the rotor blade assembly 100. The contour and orientation of the second aerodynamic surface 114 relative to the rotor blade 16 may thus produce lift upon interaction with wind flowing past the rotor blade assembly 100, supplementing the lift produced by the rotor blade 16 and increasing the total lift of the rotor blade assembly 100.

As shown in FIG. 4, the lift device 110 may have a length 118. The length 118 may be a portion of the local chord 46 at the span-wise locations along the rotor blade 16 wherein the first aerodynamic surface 112 is to be mounted, or is mounted. For example, in exemplary embodiments, the length 118 may be in the range between 25% and 50% of the local chord 46 at any span-wise location along the rotor blade 16 wherein the first aerodynamic surface 112 is to be mounted, or is mounted. Alternatively, the lift device 110 may have any suitable length 118 or range of lengths 118 with respect to a local chord 46 at any span-wise location or locations.

As shown in FIGS. 4 through 8, in some embodiments, the lift device 110 of the present disclosure may further include a channel 120 or a plurality of channels 120 defined in the second aerodynamic surface 114. The channels 120 may be configured to reduce noise associated with the rotor blade 16 and rotor blade assembly 100. Thus, in exemplary embodiments, the lift device 110 may provide increased lift and power generation to the wind turbine 10 while reducing the associated noise.

A channel 120 may extend through a portion of the, or the entire, length 118 of the lift device 110. Thus, a portion of the wind flowing over the second aerodynamic surface 114 and past the rotor blade assembly 100 may, upon encountering the channels 120, enter and interact with the channels 120. The channels 120 may induce shear flow and cause increased shear flow diffusion upon exhaustion of the wind from the channels 120, as illustrated by exhaust flow 122. This interaction of the channels 120 with the wind, and the production of turbulent exhaust flow 122, may thus reduce the noise associated with the rotor blade assembly 100.

In exemplary embodiments, as shown in FIGS. 4 through 8, a channel 120 or a portion thereof may have a generally increasing area in the flow direction 116 of the wind. Alternatively, a channel 120 or a portion thereof may have a generally tapered area in the flow direction 116, or a generally constant area in the flow direction. Further, as shown in FIGS. 4 through 8, a channel 120 may in exemplary embodiments have a generally trapezoidal shape. Alternatively, however, the channel 120 may have any suitable polygonal shape.

Each channel 120 may have a similar shape and size, or various groups of channels 120 may have similar shapes and sizes, or each channel 120 may have an individual shape and size. In some exemplary embodiments, for example, the lift device 120 may include a plurality of channels 120 defined therein. The plurality of channels 120 may include a first channel 126 and a second channel 128, or a plurality of first channels 126 and second channels 128, as shown in FIGS. 7 and 8. In some embodiments, the first channels 126 may each have a first aspect ratio, and the second channels 128 may each have a second aspect ratio different from the first aspect ratio. Additionally or alternatively, the first channels 126 may have generally identical or different lengths, widths, and/or depths, and the second channels 128 may have generally identical or different lengths, widths, and/or depths. Further, the lengths, widths, and/or depths of the first channels 126 may be identical to or different from the lengths, widths, and/or depths of the second channels 128. Additionally or alternatively, the first channels 126 may have generally identical or different shapes, and the second channels 128 may have generally identical or different shapes. Further, the shapes of the first channels 126 may be identical to or different from the shapes of the second channels 128. In exemplary embodiments, the first channels 126 and second channels 128 may alternate through the width, or any portion thereof, of the lift device 120. Alternatively, the first channels 126 and second channels 128 may be defined in any suitable arrangement or pattern.

Further, it should be understood that the present disclosure is not limited to first channels 126 and second channels 128, and rather that any suitable number of channel groups are within the scope and spirit of the present disclosure.

As shown in FIG. 9, in some embodiments, the lift device 110 of the present disclosure may further include a first layer 132 and a second layer 134. The first layer 132 may include the first aerodynamic surface 112, and the second layer 134 may include the second opposing aerodynamic surface 114.

One of the first layer 132 or the second layer 134, such as in exemplary embodiments the first layer 132, may be formed from an acoustic absorption material. The acoustic absorption material may absorb noise associated with the rotor blade 16 and rotor blade assembly 100 by absorbing a portion of the noise. For example, the acoustic absorption material may be a generally acoustically porous material. Acoustically porous material allows air to permeate the material, and the frictional interaction between the acoustically porous material and the air absorbs, dissipates, and thus reduces the noise. The acoustically porous material may be, for example, an acoustically porous cell foam material, such as polyurethane foam, polyether foam, melamine foam, or any other suitable foam. Alternatively, the acoustically porous material may be, for example, a acoustically porous natural fiber material agglomerate, such as wood fiber, coconut fiber, or any other suitable fiber. Alternatively, the acoustically porous material may be, for example, a single or multi-layer cloth material, such as cotton, linen, hemp, or any other suitable cloth material. It should be understood, however, that the acoustic absorption material according to the present disclosure is not limited to the above disclosed materials, and rather that any suitable acoustically absorbable materials are within the scope and spirit of the present disclosure.

Further, in exemplary embodiments, the layer formed from the acoustic absorption material may have an absorption coefficient. In exemplary embodiments, the absorption coefficient may be in the range between approximately 0.6 and 1.0. However, it should be understood that the absorption coefficient is not limited to the above disclosed range, and rather that any suitable range is within the scope and spirit of the present disclosure.

The other of the first layer 132 or the second layer 134, such as in exemplary embodiments the second layer 134, may be formed from a material that is stiffer and/or stronger than the material of the first layer 132 or the second layer 134. This material may act as a protective layer and/or strengthening or stiffening layer for the lift device 110. Further, in exemplary embodiments, the material may be acoustically non-porous. Thus, the material may be, for example, a polymer, such as a thermoplastic, a fiber or woven-fiber reinforced plastic, a metal, or any other suitable material. Further, in exemplary embodiments, the other of the first layer 132 or the second layer 134 comprising this material may be relatively thin compared to the first layer 132 or the second layer 134.

It should be understood that the lift device 110 of the present disclosure may be mounted to rotor blades 16 during the manufacture of the rotor blade 16, or may be retro-fit to existing rotor blades 16, to form rotor blade assemblies 100. The rotor blade assembly 100 including a rotor blade 16 and lift device 110 may desirably have increased lift and decreased noise for a given wind flow. Additionally, the addition of a lift device 110 to a rotor blade 16 to form a rotor blade assembly 100 may provide improved resistance to aerodynamic stall. For example, in some embodiments, the addition of channels 120 to the lift device 110 may provide this improved resistance. Further, the addition of a lift device 110 to a rotor blade 16 to form a rotor blade assembly 100 may provide additional structural flexural and torsional strength to the rotor blade assembly 100. This additional structural flexural and torsional strength may, in some embodiments, be caused by the increasing cross-sectional area and the resulting increased inertia.

The present disclosure is further directed to a method for increasing the lift of a rotor blade 16 for a wind turbine 10. The method may include mounting a lift device 110 to a pressure side 22 of a rotor blade 16, as discussed above. The method may further include rotating the rotor blade 16 on the wind turbine 10, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
    a rotor blade having exterior surfaces defining a pressure side, a suction side, a leading edge, and a trailing edge extending between a tip and a root; and,
    a lift device configured to increase the lift of the rotor blade assembly, the lift device comprising a first aerodynamic surface mounted to the pressure side of the rotor blade and a second opposing aerodynamic surface configured to interact with wind flowing past the rotor blade assembly,
    wherein the lift device has a generally increasing cross-sectional area in a flow direction of the wind and;
    wherein the lift device further comprises a channel defined in the second aerodynamic surface, the channel configured to reduce noise associated with the rotor blade.

2. The rotor blade assembly of claim 1, further comprising a plurality of channels.

3. The rotor blade assembly of claim 2, wherein the plurality of channels comprise a first channel having a first aspect ratio and a second channel having a second aspect ratio.

4. The rotor blade assembly of claim 1, wherein the channel has a generally increasing area in the flow direction of the wind.

5. The rotor blade assembly of claim 1, wherein the lift device has a length, and wherein the length is in the range between 25% and 50% of a local chord of the rotor blade at any span-wise location along the rotor blade wherein the first aerodynamic surface is mounted.

6. The rotor blade assembly of claim 1, wherein the first aerodynamic surface is mounted within an inner board area of the rotor blade.

7. The rotor blade assembly of claim 1, wherein the first aerodynamic surface is mounted adjacent to the trailing edge of the rotor blade.

8. The rotor blade assembly of claim 1, wherein the lift device further comprises a first layer and a second layer, the first layer comprising the first aerodynamic surface and the second layer comprising the second opposing aerodynamic surface.

9. The rotor blade assembly of claim 8, wherein the first layer is formed from an acoustic absorption material, and wherein the second layer is at least one of stiffer or stronger than the first layer.

10. The rotor blade assembly of claim 8, wherein the first layer has an absorption coefficient in the range between approximately 0.6 and approximately 1.0.

11. The rotor blade assembly of claim 8, wherein the second layer is acoustically non-porous.

12. A lift device for a rotor blade having exterior surfaces defining a pressure side and a suction side extending between a leading edge and a trailing edge, the lift device comprising:
    a first aerodynamic surface configured for mounting to the pressure side of the rotor blade; and,
    a second opposing aerodynamic surface configured to interact with wind flowing past the lift device,
    wherein the lift device has a generally increasing cross-sectional area in a flow direction of the wind, and
    wherein the lift device is configured to increase the lift of the rotor blade and;
    further comprising a channel defined in the second aerodynamic surface, the channel configured to reduce noise associated with the rotor blade.

13. The lift device of claim 2, further comprising a plurality of channels.

14. The lift device of claim 13, wherein the plurality of channels comprise a first channel having a first aspect ratio and a second channel having a second aspect ratio.

15. The lift device of claim 2, wherein the channel has a generally increasing area in the flow direction of the wind.

16. The lift device of claim 12, further comprising a first layer and a second layer, the first layer comprising the first aerodynamic surface and the second layer comprising the second opposing aerodynamic surface.

17. The lift device of claim 16, wherein the first layer is formed from an acoustic absorption material, and wherein the second layer is at least one of stiffer or stronger than the first layer.

18. A method for increasing the lift of a rotor blade for a wind turbine, the method comprising:

mounting a lift device to a pressure side of a rotor blade, the rotor blade having exterior surfaces defining the pressure side, a suction side, a leading edge, and a trailing edge extending between a tip and a root, the lift device comprising a first aerodynamic surface mounted to the pressure side of the rotor blade and a second opposing aerodynamic surface configured to interact with wind flowing past the rotor blade and having a generally increasing cross-sectional area in a flow direction of the wind, wherein the lift device further comprises a channel defined in the second aerodynamic surface, the channel configured to reduce noise associated with the rotor blade; and, rotating the rotor blade on the wind turbine.

* * * * *